(12) United States Patent
Eslambolchi et al.

(10) Patent No.: US 7,497,000 B1
(45) Date of Patent: Mar. 3, 2009

(54) METHOD FOR REPAIRING A COLLAPSED DUCT SECTION

(75) Inventors: Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 589 days.

(21) Appl. No.: 10/971,225

(22) Filed: Oct. 22, 2004

(51) Int. Cl.
*B23P 6/00* (2006.01)

(52) U.S. Cl. .................. 29/402.01; 29/402.19; 138/97; 285/15

(58) Field of Classification Search .............. 29/402.01, 29/402.11, 402, 19, 712, 402.19; 138/97; 285/15
See application file for complete search history.

(56) References Cited

U.S. PATENT DOCUMENTS

| | | | | |
|---|---|---|---|---|
| 4,789,268 A | * | 12/1988 | Yarnell | 405/184.2 |
| 4,955,755 A | * | 9/1990 | Frey | 405/155 |
| 5,027,895 A | * | 7/1991 | Barton | 166/186 |
| 5,076,730 A | * | 12/1991 | Bergey | 405/184.3 |
| 5,263,515 A | * | 11/1993 | Goodale | 138/98 |
| 6,257,266 B1 | * | 7/2001 | Valdez | 137/15.08 |
| 2002/0083990 A1 | * | 7/2002 | Lundman | 138/98 |

FOREIGN PATENT DOCUMENTS

GB  2169983 A  *  7/1986

* cited by examiner

*Primary Examiner*—Jermie E Cozart

(57) ABSTRACT

The present invention is an apparatus and method for repairing a collapsed underground duct for a fiber cable. A head is inserted into the duct until the collapsed section is sensed. Power, such as hydraulic or pneumatic pressure of electric potential, is applied to the head, actuating an expansion member that engages the duct wall and applies a force to it, forcing it to a non-collapsed state. The head may be fed through the non-collapsed duct by applying air pressure behind it, forcing through the duct until it encounters the collapsed section.

7 Claims, 4 Drawing Sheets

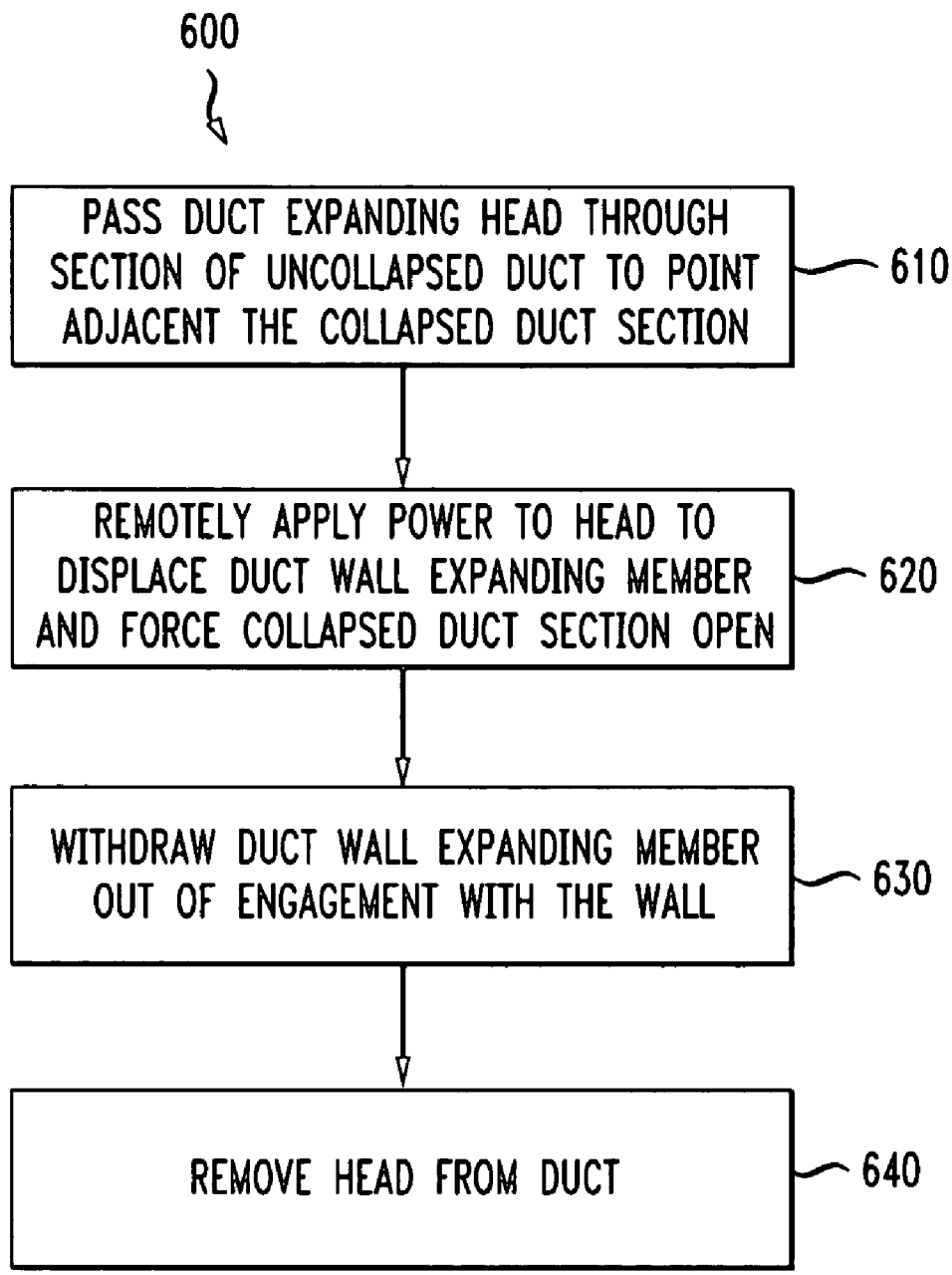

METHOD FOR REPAIRING A COLLAPSED DUCT SECTION

FIELD OF THE INVENTION

The present invention relates generally to the installation and maintenance of underground optical fiber ducts. More particularly, the present invention is an apparatus and method for repairing a fiber optic duct that has collapsed in its underground environment, without excavating the duct.

BACKGROUND OF THE INVENTION

In many urban settings, it is not possible to install underground optical communications fiber cable using open trenches. Streets, buildings, and underground utilities and infrastructure interfere with digging trenches from the surface. Similarly, when routing utilities such as fiber cables across environmentally sensitive areas such as streams, beaches and wetlands, it is undesirable to excavate a trench. In those cases, and increasingly in more traditional cases, a horizontal directional boring technique may be utilized.

In a horizontal directional boring process, ductwork is placed underground by boring a passage using 20 foot lengths of steel pipe that are fastened together and fed as the passage is bored. A pressurized slurry of clay or another substance is pumped through the steel pipe. The slurry removes material ahead of the pipe, allowing the pipe to be fed through the soil substrate. Additional lengths of pipe are added as the passageway progresses underground. An oscillator or another locator device at the end of the pipe transmits a location signal allowing the end of the pipe to be tracked from above-ground. The direction that the passage takes underground can be controlled as it is formed by aiming the slurry stream at the end of the pipes.

After the underground passage has been bored, a duct is placed in the passage for containment and protection of the optical fibers. The duct may be placed inside the steel pipe before the pipe is removed, or may be fed in from the opposite end and pushed against end of the steel pipe as the pipe is removed.

The ducts are continuous high density polyethylene (HDPE) tubes, which may range in diameter from 1½ inches to 8 inches. The tubes typically have a ⅛ inch wall. Horizontal boring operations have been successfully used to install underground polyethylene ducts thousands of feet in length.

After the polyethylene duct is installed underground, an optical fiber cable is drawn through the duct. Compressed air is often used to perform that operation. The compressed air may act on the fiber optic cable itself, or may be used to place a draw line in the duct for pulling the fiber optic cable through the duct. The compressed air may act on a moveable baffle attached to an end of the fiber cable or draw line.

Problems may be encountered in installing the fiber optic cable in the underground duct. One frequently encountered problem, as shown in FIG. 1, is the collapse of a section 150 of the duct 110 The collapsed duct may be detected as unusually high back pressure when applying compressed air to the duct, or may be a mechanical blockage preventing the cable from passing through the duct.

The collapse is a deformation of the polyethylene wall of the duct 110. The collapse may be caused, for example, by a large rock 120 in the soil substrate 140 that has shifted and applied a concentrated force on the wall of the duct. A collapsed section of duct is a major setback in a horizontal directional boring operation, because the fiber cable or other utility cannot be installed in the duct.

Two options are commonly available to overcome a collapsed duct problem and successfully complete a horizontal directional boring operation. First, the collapsed section may be approximately located using a probe, and then the collapsed section may then be excavated from the surface 130 and repaired. Excavation may be very expensive depending on the location of the problem. More importantly, it is often the case that excavation is not possible for the very reasons that horizontal directional boring was chosen as the installation method. For example, there may be buildings, streets or other utilities above the collapsed section, or the collapsed section may be under an environmentally sensitive area, or under a body of water.

If it is not possible or feasible to excavate the site of the collapsed duct, the other option available today is to re-install the duct by performing another horizontal directional boring operation. That is obviously an expensive last resort, but may be necessary in the absence of other options.

There is therefore presently a need for a reliable method and apparatus for repairing the collapsed section of underground duct without the necessity of excavating the site of the collapse. Such a technique should be relatively low cost, and should be easily used by an online service provider (OSP) technician. To the inventors' knowledge, there is currently no such apparatus or method employed to satisfactorily accomplish that task.

SUMMARY OF THE INVENTION

The present invention addresses the needs described above with an apparatus and a method for repairing a collapsed duct section. In one embodiment, an apparatus is provided for repairing a collapsed duct section that is accessible through a section of non-collapsed duct. The apparatus includes a body having a cross sectional size permitting passage of the body through the section of non-collapsed duct, a duct wall expanding member moveably connected to the body for engaging a wall of the collapsed duct section; an actuator connected between the body and the duct wall expanding member, for moving the at least one expanding member to apply an expanding force on the wall of the collapsed duct section; and a remote control for controlling the actuator from an access point of the section of the non-collapsed duct.

The actuator may move the duct wall expanding member in a radial direction in the duct. In that case, the duct wall expanding member may be a finger protruding from a distal end of the body.

The actuator may move the duct wall expanding member in an axial direction in the duct. In that case, the duct wall expanding member may be a tapered nose extending in a distal direction from the body.

The actuator may be a hydraulic cylinder. The remote control in that case may further include a hydraulic pump, and hydraulic pressure hoses connecting the hydraulic pump to the actuator. The hydraulic hoses have a length sufficient to extend through the non-collapsed section of duct.

The actuator may alternatively be a pneumatic cylinder. The remote control in that case may include a pneumatic compressor, and pneumatic lines connecting the compressor to the actuator. The pneumatic lines have a length sufficient to extend through the non-collapsed section of duct.

The apparatus may further include a spring return mechanism for retracting the expanding member out of engagement with the duct. Further, the actuator may be an electric motor.

In another embodiment of the invention, a method is provided for repairing a collapsed duct section that is accessible through a section of non-collapsed duct. The method includes the steps of moving a duct expanding head through the section of non-collapsed duct to a point adjacent the collapsed duct section; remotely applying power to the head through power lines extending the length of the non-collapsed section; the power displacing a duct wall expanding member of the head to engage a wall of the collapsed duct section and to force the collapsed duct section open; withdrawing the duct wall expanding member out of engagement with the wall; and removing the head from the duct.

The method may also include the step of sensing a location of the collapsed duct section by sensing a contact of the head with the collapsed section.

The step of moving the duct expanding head through the section of non-collapsed duct may further comprise applying compressed gas to the duct to move the head inside the duct.

The step of remotely applying power to the head may further comprise applying hydraulic pressure to hydraulic fluid in lines extending from the head through the non-collapsed section; or may comprise applying pneumatic pressure to a gas in pneumatic lines extending from the head through the non-collapsed section; or may comprise applying an electric potential to wires extending from the head through the non-collapsed section.

The applied power may displace the duct wall expanding member of the head in a direction parallel to an axis of the pipe, or may displace the duct wall expanding member of the head in a radial direction in the pipe.

The applied power may displace a plurality of duct wall expanding members.

BRIEF DESCRIPTION OF THE DRAWINGS

FIG. 6 is a flow chart of a method according to one embodiment of the invention.

DESCRIPTION OF THE INVENTION

Figure 1:
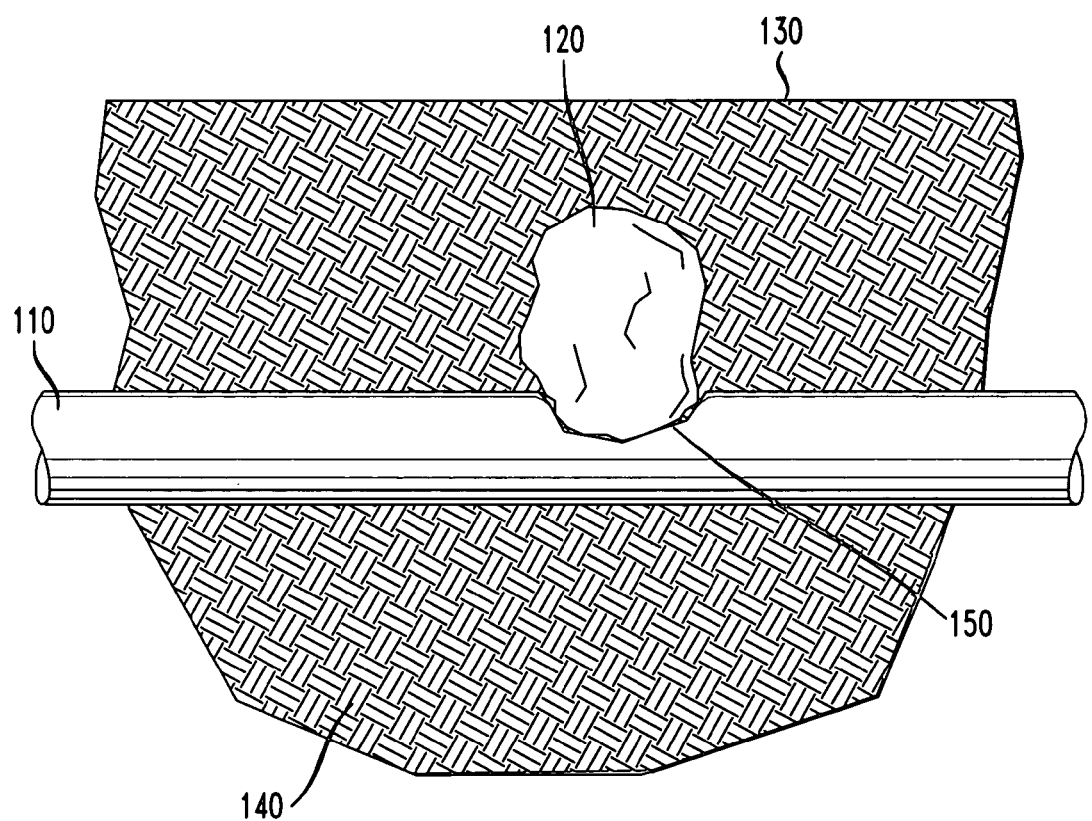
FIG. 1 is a schematic cross sectional view of a fiber optic cable duct in situ.
Figure 2:
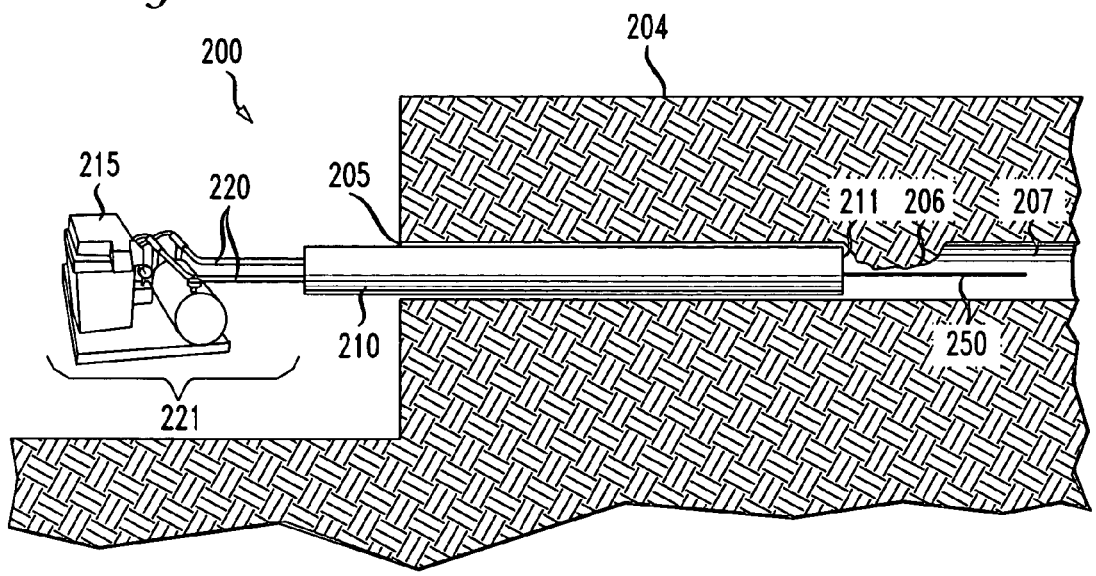
FIG. 2 is a schematic diagram of a duct repair system according to one embodiment of the invention.

An apparatus 200 according to the invention for repairing a collapsed section 206 of a fiber optic cable duct 207 is shown in FIG. 2. The duct 207 is shown buried below the surface 204 of the ground. A horizontal directional boring access point 205 is shown as entering the ground through a vertical surface such as a manhole. One skilled in the art will recognize that a horizontal directional boring operation may enter the ground through a horizontal surface as well.

A tool head 210 of the repair apparatus 200 is shown schematically as an elongated cylinder, although other shapes may be used. Power is provided to the tool head 210 via power lines 220 from a power source 215. The power lines 220 and power source 215 collectively comprise a remote control 221.

In one embodiment of the invention, the power lines 220 are hydraulic lines and the power source 215 is a hydraulic pump. In another embodiment of the invention, the power lines are pneumatic lines and the power source is a pneumatic compressor. Alternatively, the power lines may be electric lines and the power source may be an electrical power source such as a generator or line voltage.

The tool head 210 is shown partially inserted in the duct 207. Extending from a distal end 211 of the head 210 is a duct wall expanding member 250 shown contacting the collapsed section 206 of the duct 207. As described in more detail below, the duct wall expanding member 250 is actuated by the remote control 221 to apply an expanding force on a wall of the collapsed section 206.

Figure 3:
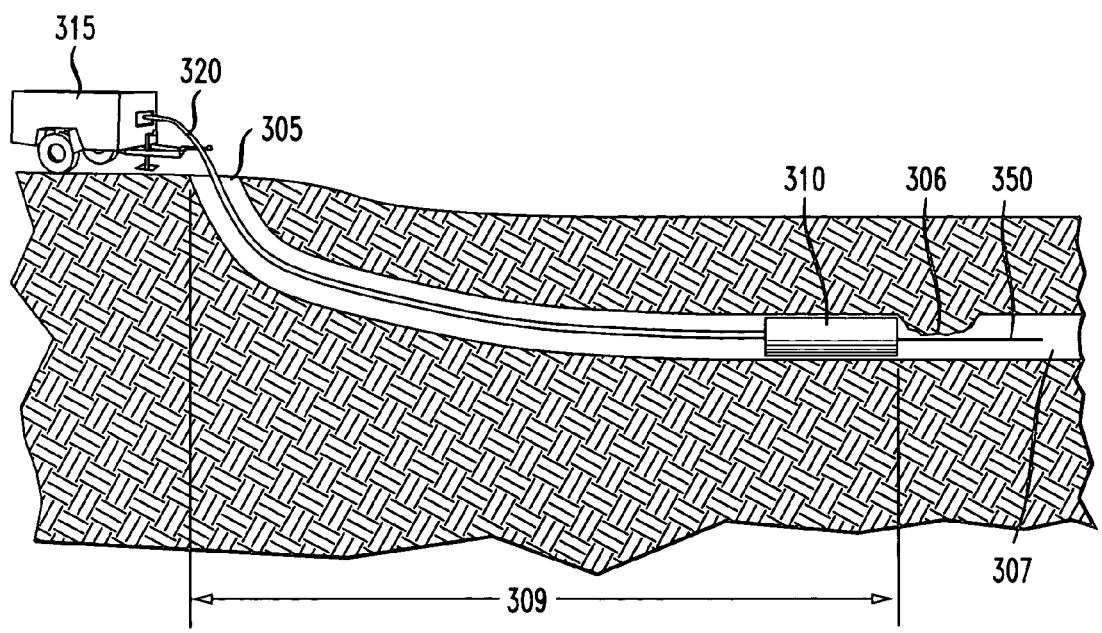
FIG. 3 is a schematic diagram of a duct repair system according to one embodiment of the invention.

A tool head 310 of the repair apparatus (FIG. 3) is shown advanced in the duct 307 to a point adjacent a collapsed duct section 306. The head 310 was moved through a non-collapsed section 309 of the duct 307 using pressurized gas applied at the access point 205 of the duct. One skilled in the art will recognize that other techniques may be used to move the head through the duct.

As the head 310 advances through the duct 307, the power line 320 is trailed through the non-collapsed section 309, maintaining a connection between the head 310 and the power supply 315. The power line 320 must be of sufficient length to span the non-collapsed section 309 and maintain the connection.

The head eventually encounters the collapsed section 306 and will be unable to pass that section. At that point, it is considered that the collapsed section has been located. The head is activated using the remote control by providing power from the power supply 315 through the power line 320. The duct wall expanding member 350 moves into contact with a wall of the collapsed section 306 of the duct and applies a force to that wall, expanding it.

Figure 4:
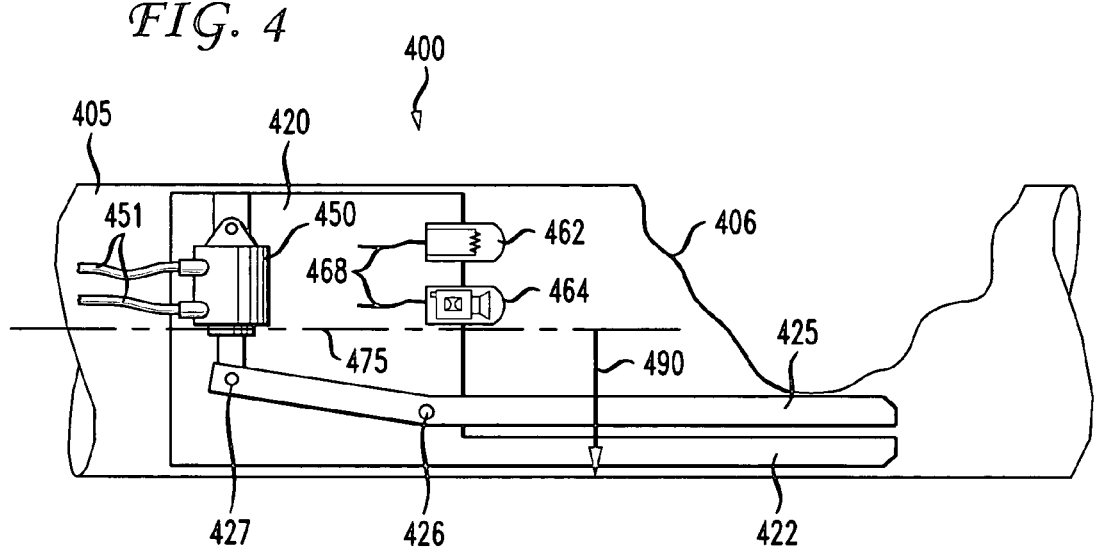
FIG. 4 is a schematic diagram of a tool head of a duct repair system according to one embodiment of the invention.

One embodiment of a head 400 (FIG. 4) used in the apparatus of the invention includes a body 420 having a cross sectional size permitting passage of the head through the duct 405. Extending from the body 420 in a distal direction, or a direction away from the remote control lines 451, is a stationary finger 422. The stationary finger 422 in proximity to a wall of the duct 405.

Also extending from the body 420 in a distal direction is a duct wall expanding member in the form of a moveable finger 425 attached at a pivot point 426 to the body 420. The moveable finger 425 is displaceable in a direction away from the stationary finger 422 by pivoting about the pivot point 426.

An actuator 450 is connected between the moveable finger 425 and the body 420, and is attached to moveable finger at pivot 427. In the embodiment shown, the actuator is a hydraulic cylinder; however, other actuators, such as a pneumatic cylinder, an electric solenoid or an electric motor-driven ball screw may be used. Power lines 451, in this embodiment being hydraulic lines, are connected to the actuator 450 and extend back through the non-collapsed portion of the duct to the power supply (not shown).

In use, the head 400 is moved through the non-collapsed portion of the duct until it encounters a collapsed portion 406. The fingers 425, 422 may be shaped to be self-orienting, in which case the head would rotate about a duct axis 475 as tips of the fingers are cammed around the collapsed section 406. In another embodiment, a camera 464 and a light 462 are used to provide information to an operator to rotationally align the head with the collapsed portion 406 by rotating a flexible member (not shown) attached to the head and running with the power lines 451.

After the head is aligned, the actuator 450 is activated by, for example, applying hydraulic pressure through the lines 451. The moveable finger 425 rotates about the pivot 426, moving away from the stationary finger 422 and applying a force on the wall of the collapsed section 406, and causing the section to open. After the collapsed section is opened, the power is shut off and the head 400 is withdrawn from the duct. The power may be reversed to withdraw the finger from the wall, facilitating removal of the head. Alternatively, the moveable finger 425 may be spring loaded to return to a neutral position.

In an alternative embodiment of the invention, the stationary finger 422 may be eliminated. In that case, an elongated body 420 may provide stability to counteract the moment created by the moveable finger 422 in contact with the collapsed section 406.

It can be seen that the moveable the duct wall expanding member moves in a direction parallel with a radius 490 of the cylindrical duct 405; i.e., the finger 425 moves in a radial direction. One skilled in the art will recognize that other configurations having radially moving duct wall expanding members are possible. For example, the duct wall expanding member 425 may be an expandable collet having a plurality of fingers movable in radial directions spaced around the circumference of the duct.

Figure 5:
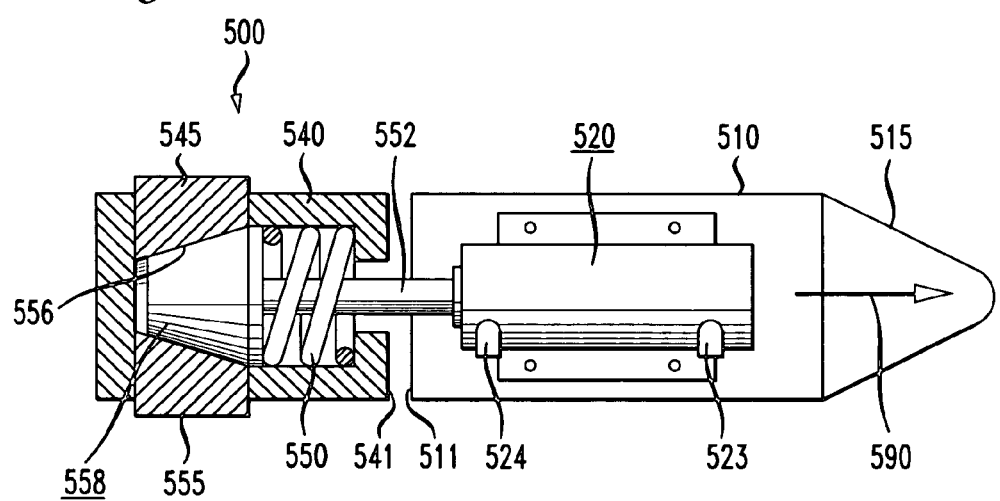
FIG. 5 is a schematic diagram of a tool head of a duct repair system according to another embodiment of the invention.

In another embodiment shown in FIG. 5, a tool head 500 comprises a housing 540 and a duct wall expanding member 510. An actuator comprising a hydraulic cylinder 520 connects the housing 540 and the duct wall expanding member 510 and moves the expanding member in a distal, axial direction 590 parallel with an axis of the duct. The duct wall expanding member 510 has a conical or tapered nose 515 for contacting the collapsed duct wall and forcing it open. One advantage of that configuration is that the head 500 need not be oriented rotationally with respect to the collapsed portion of the duct.

The hydraulic cylinder 520 is actuated via hydraulic pressure through ports 523, 524 connected to lines (not shown) that run through the non-collapsed portion of the duct. The cylinder 520 may be actuated in either direction by pressurizing one or the other of the ports.

The housing 540 contains anchoring jaws 545, 555 that are slideably retained in slots in the housing 540. The anchoring jaws are free to slide radially in and out, but are otherwise captured in the slots. While two anchoring jaws 545, 555 are shown, any number of jaws may be spaced circumferentially around the housing 540. The anchoring jaws may have knurled or serrated outer surfaces to facilitate gripping an inner surface of the duct.

The anchoring jaws have a tapered inner surface 556 that matches a taper on a conical member 558. The conical member is attached to a cylinder rod 522 and is moveable in an axial direction by the hydraulic cylinder 520. As the conical member 558 moves in an axial direction, the anchoring jaws are cammed radially by the mating tapers on the respective parts. A compression spring 550 biases the conical member in a direction causing the anchoring jaws 545, 555 to extend outward in a radial direction.

In use, the port 524 of the hydraulic cylinder 520 is pressurized before placing the head 500 in the duct. Pressurizing the port 524 of the hydraulic cylinder 520 retracts the cylinder rod 522, moving the conical member toward the cylinder, causing the surfaces 511, 541 to abut and retracting the jaws. The head is moved through the non-collapsed portion of the duct until it contacts a collapsed portion. At that point, the port 523 is pressurized, extending the cylinder rod and allowing the spring 550 to move the conical member 558, expanding the jaws 545, 555. The expanded jaws contact the inner surface of the duct and anchor the housing 540 in the duct. The cylinder rod 522 continues to extend, driving the tapered nose 515 of the duct wall expanding member 510 in the distal direction 590, forcing the collapsed portion of the duct open. The force required to drive the expanding member 510 through the collapsed portion of the duct is applied directly on conical member 558 by the cylinder rod, further expanding the anchoring jaws 545, 555.

A method 600 for repairing a collapsed duct section in accordance with one embodiment of the invention is shown in FIG. 6. The method is used to repair a collapsed duct section that is accessible through a section of non-collapsed duct.

The duct expanding head is first moved (step 610) through the section of non-collapsed duct to a point adjacent the collapsed duct section. The head may be moved, for example, by applying a pressurized gas to the entrance of the duct, "blowing" the head through the duct. As the head is moved through the duct, the power line is pulled through as well.

Power is remotely applied (step 620) to the head through power lines extending the length of the non-collapsed section. For example, hydraulic or pneumatic lines may be pressurized, or an electrical potential may be applied across electrical power lines. In any case, the power displaces a duct wall expanding member of the head to engage a wall of the collapsed duct section and to force the collapsed duct section open.

The duct wall expanding member is then withdrawn (step 630) out of engagement with the wall. In one embodiment, that is done by a spring operating in a direction opposite the actuator. Alternatively, the power applied to the actuator may be reversed, such as by pressurizing an opposite port of a hydraulic or pneumatic cylinder. The duct wall expanding member may also be withdrawn from engagement with the wall by simply moving the head away from the collapsed section of duct; for example, the head may be pulled by an attached tether.

Finally, the head is removed (step 640) from the duct. That may be done by pulling the head out by an attached tether or by the power line. Alternatively, the head may be blown out by applying pressurized gas to the opposite end of the duct.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method and apparatus of the invention are described herein with respect to the repair of an underground fiber optic cable duct that has been installed using underground directional boring technology, the method and apparatus of the invention may be used to repair a collapsed section of any long duct or tube. For example, underground water lines, steam lines, power line ducts and sewage lines are all candidates for using the method and apparatus of the invention. It is to be understood that the embodiments shown and described herein are only illustrative of the principles of the present invention and that various modifications may be implemented by those skilled in the art without departing from the scope and spirit of the invention.

What is claimed is:

1. A method for repairing a collapsed duct section, the collapsed duct section being accessible through a section of non-collapsed duct, the method comprising the steps of:

moving a duct expanding head through the section of non-collapsed duct to a point adjacent the collapsed duct section;

remotely applying power to the head through power lines extending the length of the non-collapsed section; the power displacing a duct wall expanding member of the head to engage a wall of the collapsed duct section and to force the collapsed duct section open, the duct wall expanding member engaging the wall of the collapsed duct section in a direction away from an engagement of another portion of the wall by a finger that is stationary with respect to the head;

withdrawing the duct wall expanding member out of engagement with the wall; and removing the head from the duct.

2. The method of claim 1, further comprising the step of:

sensing a location of the collapsed duct section by sensing a contact of the head with the collapsed section.

3. The method of claim 1, wherein the step of moving the duct expanding head through the section of non-collapsed duct further comprises applying compressed gas to the duct to move the head inside the duct.

4. The method of claim 1, wherein the step of remotely applying power to the head further comprises applying hydraulic pressure to hydraulic fluid in lines extending from the head through the non-collapsed section.

5. The method of claim 1, wherein the step of remotely applying power to the head further comprises applying pneumatic pressure to a gas in pneumatic lines extending from the head through the non-collapsed section.

6. The method of claim 1, wherein the step of remotely applying power to the head further comprises applying an electric potential to wires extending from the head through the non-collapsed section.

7. The method of claim 1, wherein the applied power displaces the duct wall expanding member of the head in a radial direction in the duct.

* * * * *